United States Patent
Boyle et al.

(10) Patent No.: US 8,689,301 B2
(45) Date of Patent: Apr. 1, 2014

(54) SIP SIGNALING WITHOUT CONSTANT RE-AUTHENTICATION

(75) Inventors: Frank J. Boyle, Denver, CO (US);
Gordon Brunson, Broomfield, CO (US);
David Chavez, Broomfield, CO (US);
Stephen Durney, Broomfield, CO (US);
Gregory Weber, Westminster, CO (US)

(73) Assignee: Avaya Inc., Basking Ridge, NJ (US)

( * ) Notice: Subject to any disclaimer, the term of this patent is extended or adjusted under 35 U.S.C. 154(b) by 820 days.

(21) Appl. No.: 12/242,105

(22) Filed: Sep. 30, 2008

(65) Prior Publication Data

US 2010/0082977 A1    Apr. 1, 2010

(51) Int. Cl.
*H04L 29/06* (2006.01)

(52) U.S. Cl.
USPC .................................. 726/7; 726/12; 713/155

(58) Field of Classification Search
None
See application file for complete search history.

(56) References Cited

U.S. PATENT DOCUMENTS

| | | | |
|---|---|---|---|
| 5,235,642 A * | 8/1993 | Wobber et al. | 713/156 |
| 6,463,474 B1 * | 10/2002 | Fuh et al. | 709/225 |
| 7,131,000 B2 * | 10/2006 | Bradee | 713/164 |
| 7,536,722 B1 | 5/2009 | Saltz et al. | |
| 7,707,416 B2 * | 4/2010 | Isaacson et al. | 713/168 |
| 2002/0046348 A1 | 4/2002 | Brustoloni | |
| 2003/0115488 A1 * | 6/2003 | Kunito et al. | 713/201 |
| 2004/0179689 A1 * | 9/2004 | Maggenti et al. | 380/270 |
| 2006/0085545 A1 * | 4/2006 | Borella et al. | 709/227 |
| 2007/0213078 A1 * | 9/2007 | Shaheen | 455/466 |
| 2007/0255952 A1 * | 11/2007 | Zhou | 713/168 |
| 2007/0294758 A1 | 12/2007 | Berg et al. | |
| 2008/0098473 A1 | 4/2008 | Liu et al. | |
| 2008/0155659 A1 * | 6/2008 | Gazier et al. | 726/4 |
| 2008/0178273 A1 * | 7/2008 | Weber | 726/7 |
| 2009/0013078 A1 * | 1/2009 | Bencheikh | 709/227 |
| 2010/0046732 A1 * | 2/2010 | James et al. | 379/211.01 |

FOREIGN PATENT DOCUMENTS

| | | |
|---|---|---|
| EP | 1422590 A2 * | 5/2004 |
| EP | 1422590 A3 | 7/2009 |
| GB | 2463758 A | 3/2010 |

OTHER PUBLICATIONS

U.S. Appl. No. 11/106,314, filed Apr. 14, 2005, Goringe.
Wikipedia, "TCP/IP model", http://en.wikipedia.org/wiki/Tcp/ip_model, Jun. 26, 2008, 8 pages, USA.
Wikipedia, "Session Border Controller", http://en.wikipedia.org/wiki/Transport_Layer_Security, Jun. 16, 2008, 13 pages, USA.
Wikipedia, "Transport Layer Security", http://en.wikipedia.org/wiki/Session_Border_Controller, Jun. 17, 2008, 4 pages, USA.

(Continued)

*Primary Examiner* — Michael R Vaughan

(57) ABSTRACT

A proxy server causes an authentication authority to authenticate a client in response to a first Session Initiation Protocol (SIP) request of the client on a connection. It does not cause the client to be authenticated in response subsequent requests on the connection as long as the underlying connection is not broken, the subsequent requests are on behalf of the same client, the client has not been removed from the system, the client's password has not changed, a "safety net" timer has not expired, or any other policy that the server chooses to enforce. This eliminates the overhead of constant re-authentication in response to each SIP request.

32 Claims, 5 Drawing Sheets

(56) References Cited

OTHER PUBLICATIONS

OWASP, "Session Management", http://www.owasp.org/index/php/Session_Management, Apr. 6, 2008, 12 pages, USA.

Luke Murphey, "Secure Session Management Preventing Security Voids in Web Applications", The SANS Institute, Jan. 10, 2005, 29 pages, USA.

Paul Johnston, "Authentication and Session Management on the Web", The SANS Institute, Nov. 28, 2004, 31 pages, USA.

T. Dierks, C. Allen, "The TLS Protocol, Version 1.0", http://www.ietf.org/rfc/rfc2246.txt, The Internet Society, Jan. 1999, 70 pages.

"Web Application Security Workshop", The SANS Institute, 2008, 26 pages.

* cited by examiner

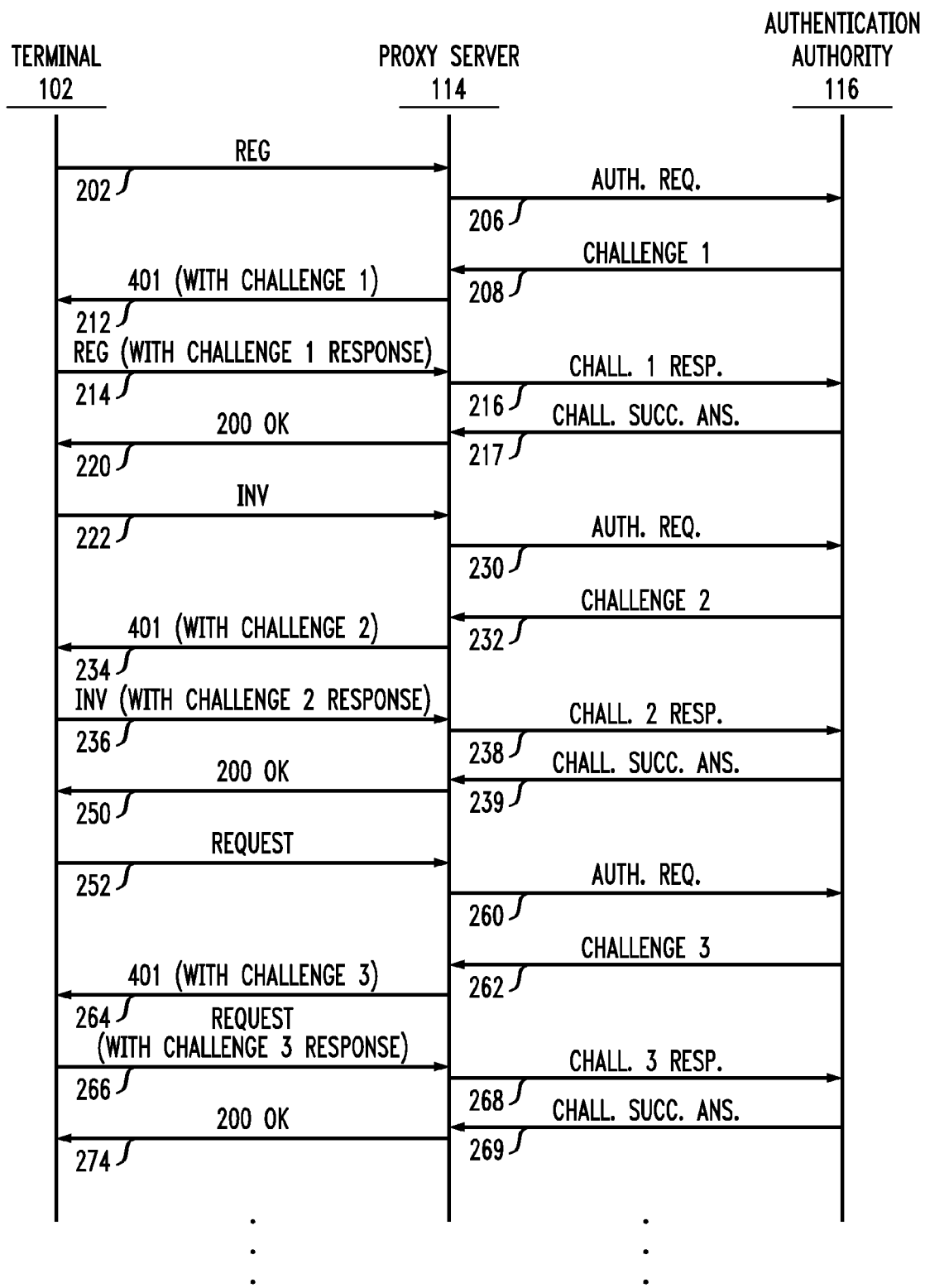

SIP SIGNALING WITHOUT CONSTANT RE-AUTHENTICATION

TECHNICAL FIELD

This invention relates to transmission protocols of communications networks.

BACKGROUND OF THE INVENTION

The Session Initial Protocol (SIP) is a computer network protocol that is often used for Voice over Internet Protocol (VoIP) telephony (including multimedia) to establish, manage, and terminate communications sessions. A session is a semi-permanent interactive information exchange between communicating entities (for example, a call). SIP resides at the application layer of the Transmission Control Protocol/Internet protocol (TCP/IP) model and at the session layer of the International Organization for Standardization (ISO) Open Systems Interconnection (OSI) model for computer network protocols. With standard SIP signaling, every request from a client is authenticated by a challenge/response mechanism on a request-by-request basis before the request is allowed to be processed, even if those requests are within the same session. This presents a high authentication overhead to systems that use SIP.

Some TCP/IP application-layer signaling protocols, such as the Transport Layer Security (TLS) protocol or the Internet Protocol security (IPsec) protocol, establish a certificate-based trust relationship between the client and the server over the TLS or IPsec channels. Such trust-based relationships eliminate the need to challenge every request. But this does not affect the operation of higher protocols, such as SIP, that may use ("reside on top of") TLS as a transport-layer protocol. (The transport layer responds to requests from the application layer to deliver data to the appropriate application process on a host computer.) Moreover, it comes at the cost of needing to deploy unique certificates on every client device. For example, the 3GPP/TISPAN IMS system has an element called a Proxy Call Session Control Function (PCSCF) that is the first point of contact for an IMS terminal. The PCSCF, which is a SIP proxy, can be either in a visited network or a home network. Some networks may also use a Session Border Controller (SBC) for this function. An IMS terminal discovers its PCSCF via the Dynamic Host Configuration Protocol (DHCP) or it is assigned in the Packet Data Protocol (PDP) context within a General Packet Radio System (GPRS). A PCSCF is assigned to the terminal at registration and it does not change for the duration of the registration. The PCSCF is in the path of all signaling messages and can inspect every message. The PCSCF authenticates the user and establishes an IPsec trusted security relationship with the IMS terminal. This places an administrative burden on the customer.

Single Sign-On (SSO) is a method of access control that enables a user to log in once and gain access to the resources of multiple systems without being prompted to log-in again. It provides both session and user authentication. Each client is given a token or software to handle authentication with a network authentication server. Single Sign-Off is the reverse process whereby a single action of signing out terminates access to the multiple systems. SSO also has no effect on the operation of protocols that are used for SSO.

Secure Shell (SSH) is a network protocol that allows data to be exchanged using a secure channel between two networked devices. Typically used to log into a remote server and execute commands, it uses public-key cryptography to authenticate a client and the server. The client sets up a secure connection to the server, requests service, gets challenged, answers the challenge, and thereafter subsequent requests are not challenged. The authentication is permanent (as long as the connection stays up) and does not allow the server to be re-challenged.

Public key infrastructure (PKI) arrangements enable computer users without prior contact to be authenticated to each other and to encrypt messages to each other. PKI binds public keys with respective user identities by means of a certificate authority (a.k.a., trusted third party). A signer's public key certificate may also be used by a third-party to verify the digital signature of a message that was created using the signer's private key. In general, a PKI enables the parties in a dialogue to establish confidentiality, message integrity, and user authentication without having to exchange any secret information in advance, or even any prior contact. It is used by many application-layer protocols to establish secure communications.

X.509 is an ITU-T standard for PKI and Privilege Management Infrastructure (PMI). X.509 specifies, amongst other things, standard formats for public key certificates, certificate revocation lists, attribute certificates, and a certification path validation algorithm.

Hypertext Transfer Protocol over Secure Sockets Layer (HTTPS) is an application-layer protocol that is used to provide authentication and encryption on the World Wide Web for security-sensitive communications, and the Simple Object Access Protocol (SOAP) is a TCP/IP application-layer protocol that uses HTTPS as a transport-layer protocol for exchanging messages over networks. HTTPS requires an administrator to create a public key certificate for the web server that any accessing client is able to validate based upon the trusted certificates already held by the client. To pass validation, the certificate must be signed by a certificate authority. This scheme can also be used for client authentication in order to restrict access to the web server to only authorized users. This requires the site administrator to create a certificate for each user and this certificate is loaded into the user's browser or client device.

Both SSO and HTTPS are cookie-based. A cookie is established in response to a first request, and a secure token based on the cookie is received in each subsequent request. That token must be validated, and the validation requires server effort on a per-message basis. This also requires client capabilities in managing, storing, and using cookies.

An alternative approach to the problem of public authentication of public key information across time and space is the Web of Trust scheme, which uses self-signed certificates and third party attestations of those certificates to establish the authenticity of the binding between a public key and a user. Unlike PKI, which relies on a certificate authority (or a hierarchy thereof), the trust model of the Web of Trust is decentralized: the Web of Trust does not imply the existence of a single web of trust, or common point of trust, but any number of potentially disjoint "webs of trust". Like in the cookie-based approach, any new request must be authenticated, which creates a network-side processing bottleneck. Also, each client must manage, store, and properly validate the certificates used in the Web of Trust.

SUMMARY OF THE INVENTION

The idea presented here is to not challenge requests subsequent to a first request that are made over a (preferably secure) connection, as long as that connection is not broken, subsequent requests are on behalf of the same client, the client has not been removed from the system, the client's password has not changed, a "safety net" timer has not expired, or any other policy that the server chooses to enforce. In other words, the first request over a connection is challenged, but once that challenge has been successfully answered, the client is given a "free pass" so that subsequent requests are not challenged until some predetermined criterion is met. Preferably, the invention profits from the protection of a properly-secured transport-layer connection at a lower-layer (e.g., TLS) protocol to alleviate the burden of authenticating every request being sent to the higher-level protocol (e.g., SIP) as long as the connection is not broken, stale, or pirated. This idea is different from the prior art in eliminating subsequent challenge/response overhead for every request within a session, yet preferably, eliminating the need for unique host credentials (certificates) per client and the administrative burden that such certificates represent.

According to an aspect of the invention, in response to a first request (e.g., a SIP request) of a client on a communication connection, the client is authenticated (e.g., via a challenge/response mechanism). In response to at least one second request of the client on the connection, and subsequent to the first request, authentication of the client is not performed. But in response to a third request of the client on the connection and subsequent to the at least one second request, the client is again authenticated. Illustratively, the re-authentication (the third request) occurs when the underlying connection has been broken and reestablished, or the request is on behalf of a different client, or a "safety net" timer has expired. If authentication is successful, or does not occur, the request is complied with; if authentication is unsuccessful, the request is not complied with.

The invention may be implemented both as a method and an apparatus, as well as a computer-readable medium containing instructions which, when executed by a computer, cause the computer to perform the method.

BRIEF DESCRIPTION OF THE DRAWINGS

FIG. 2 is a signaling diagram of prior-art SIP signaling in the network of FIG. 1.

DETAILED DESCRIPTION

Figure 1:
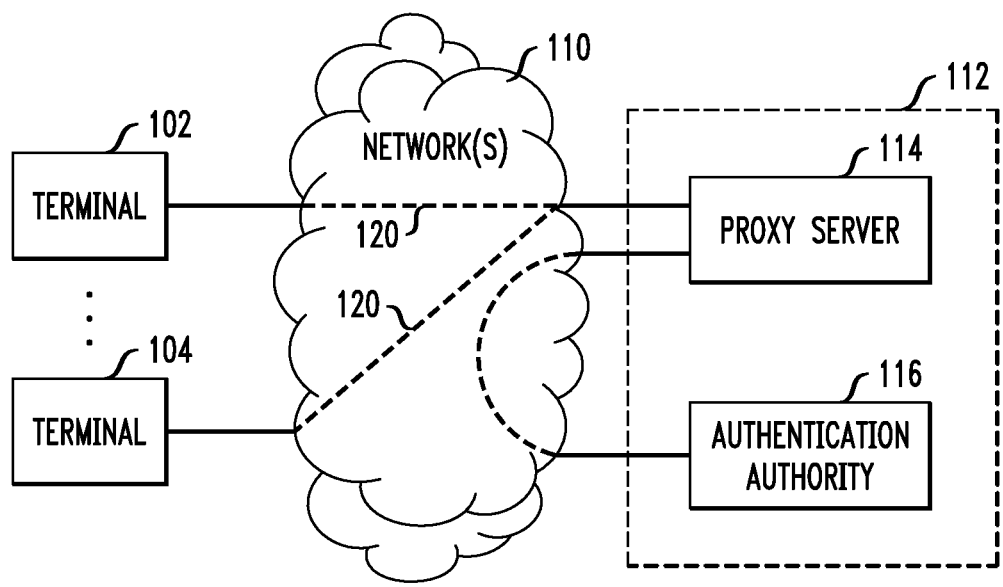
FIG. 1 is a block diagram of a communications network.

FIG. 1 shows an illustrative communications system wherein a plurality of communication terminals 102-104 are interconnected with each other and with an authorization entity 112 by one or more networks 110. Terminals 102-104 can be any type of end-user communication devices, such as cell phones, personal digital assistants, Voice over Internet Protocol (VoIP) telephones, personal computers, etc. Or, they can be any type of servers, such as web page servers, email servers, instant messaging (IM) servers, database servers, gateway caches, etc. Network(s) 110 can comprise any type of networks, such as local area networks (LANs), wide area networks (e.g., the Internet), Asynchronous Transfer Mode (ATM) networks, etc.

Authentication entity 112 is any entity that authenticates the identity of users of terminals 102-104. In this illustrative example, authentication entity 112 comprises a proxy server 114 and an authentication authority 116. Proxy server 114 is a server that services the requests of its clients among users of terminals 102-104 by forwarding the requests to servers among terminals 102-104. A client connects to proxy server 114 requesting some service, such as a file connection, web page, or other resource, that is available from a server. The proxy server 114 provides the resource by connecting to the server and requesting the service on behalf of the client. One of the services provided by proxy server 114 is user authentication, which it provides with the assistance of (i.e., through) authentication authority 116. Proxy server 114 is illustratively a stored-program controlled machine comprising a store storing instructions and a processor, such as a computer, for executing the instructions, wherein the store and the processor form the proxy server. Authentication authority 116 is a server, such as a certificate manager or a trusted third party, for example, that contains information that is used to authenticate users.

Illustratively, network 110 comprises a SIP network, an X.323 network, a Web Services network, or some other network that uses a protocol that authenticates each and every user request within a session, irrespective of whether an underlying protocol already provides communications connection security (e.g., the TLS or the TCP protocol) or does not provide communications connection security (e.g., the UDP or the TCP protocol). This need to constantly re-authenticate users requires proxy server 114 to communicate with authentication authority 116 each time that the user makes a request to proxy server 114.

An example of this is shown in FIG. 2 in the context of a SIP network. To initiate communications, a terminal 102 generates a SIP registration request (REG). The request includes the address of record (AOR) of the user of terminal 102 (a client). The underlying transport protocol establishes a TLS connection 120 between terminal 102 and proxy server 114 to a particular socket of proxy server 114. The connection has a unique identifier (a connection identifier). Terminal 102 then sends the REG to proxy server 114 over that connection 120, at step 202. Each request sent by terminal 102 to proxy server 114 as a part of the session, including the REG request, contains the AOR of the client and the connection identifier of the connection 120. For example, TCP uses the 4-tuple of {terminal IP address, terminal IP port, server IP address, server IT port} as a connection identifier. In response to receiving the REG, proxy server 114 sends an authorization request that includes the AOR to authentication authority 116, at step 206. Authority 116 responds by sending a first challenge for the client to proxy server 114, at step 208. In response, proxy server 114 sends a 401 ("authentication required") SIP message (or some other such SIP message such as a 407 ("proxy authentication required")) containing the first challenge to terminal 102 over the connection 120, at step 212. Terminal 102 responds with another REG request that includes the client's response to the first challenge, at step 214. Proxy server 114 forwards this response to authentication authority 116, at step 216. If the response is timely, authority 116 compares the response received from terminal 102 with the stored correct response, and if they match, sends a "challenge successfully answered" message to proxy server 114, at step 217. In response, proxy server 114 sends a 200 OK SIP message to terminal 102, at step 220.

When terminal 102 wishes to initiate a call, it generates and sends an invite SIP request (INV) to proxy server 114, at step 222. In response to this request, proxy server 114 sends another authorization request to authority 116, at step 230. Authority 116 responds with a second challenge to the client, at step 232. Proxy server 114 forwards the second challenge to terminal 102 in a 401 SIP message, at step 234. Terminal 102 responds with an INV SIP message containing the client's response, at step 236, which proxy server 114 forwards to authentication authority 116, at step 238. If the client's response is timely and matches the correct response, authority 116 sends a "challenge successfully answered" message to proxy server 114, at step 239, and proxy server 114 sends a 200 OK SIP message to terminal 102, at step 250.

When terminal 102 sends another request to proxy server 114, at step 252, proxy server 114 sends another authorization request to authority 116, at step 260, and authority 116 returns a third challenge, at step 262. Proxy server 114 sends a 401 SIP message with the third challenge to terminal 102, at step 264, and terminal 102 re-sends the request with the client's response to the third challenge, to proxy server 114, at step 266, which proxy server forwards to authentication authority 116, at step 268. If the client's response is timely and matches the correct response, authority 116 sends a "challenge successfully answered" message to proxy server 114, at step 269, and proxy server 114 sends a 200 OK SIP message to terminal 102, at step 274. And so on for each subsequent SIP request.

Particularly when proxy server 114 and authentication authority 116 are separate devices that communicate with each other via a network (e.g., via network 110 in FIG. 1), this constant communicating between servers 114 and 116 places a heavy load on authentication authority 116, creates a lot of network traffic, and is time consuming, all of which are undesirable.

According to an aspect of the invention, operation of proxy server 114 is modified such that proxy server 114 does not authenticate each and every request of every client with authentication authority 116. Rather, proxy server 114 relies on the trusted relationships that have been established between terminals 102-104 and proxy server 114 over connections 120 by the transport protocol, such as TLS or IPsec, to provide security for extended periods of time. But even if the transport protocol is insecure, such as UDP or TCP, authentication of every request may not be necessary if a high level of security is not a concern. In such a case, it is important that the underlying transport protocol provide a session with protection against hijacking of the session, and report dissolution of the session.

Figure 3:
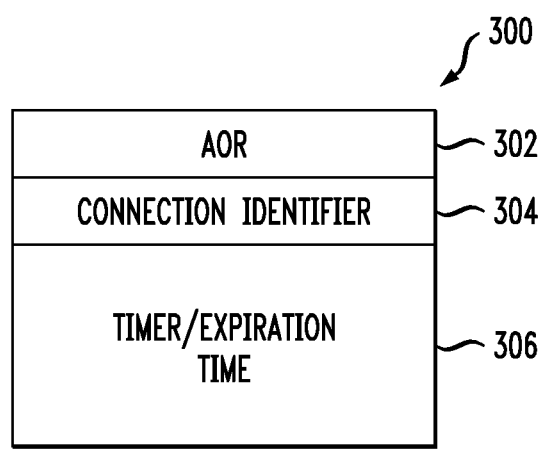
FIG. 3 is a block diagram of a user data record.

According an illustrative example of such modification in the context of the SIP protocol, proxy server 114 maintains a user data record 300, shown in FIG. 3, for each registered user of terminals 102-104. Record 300 has an entry 302 containing the client's AOR, an entry 304 containing the connection identifier of the client's connection to proxy server 114, and an entry 306 containing either a timer or a time when a current authentication of the client will expire.

Figure 4:
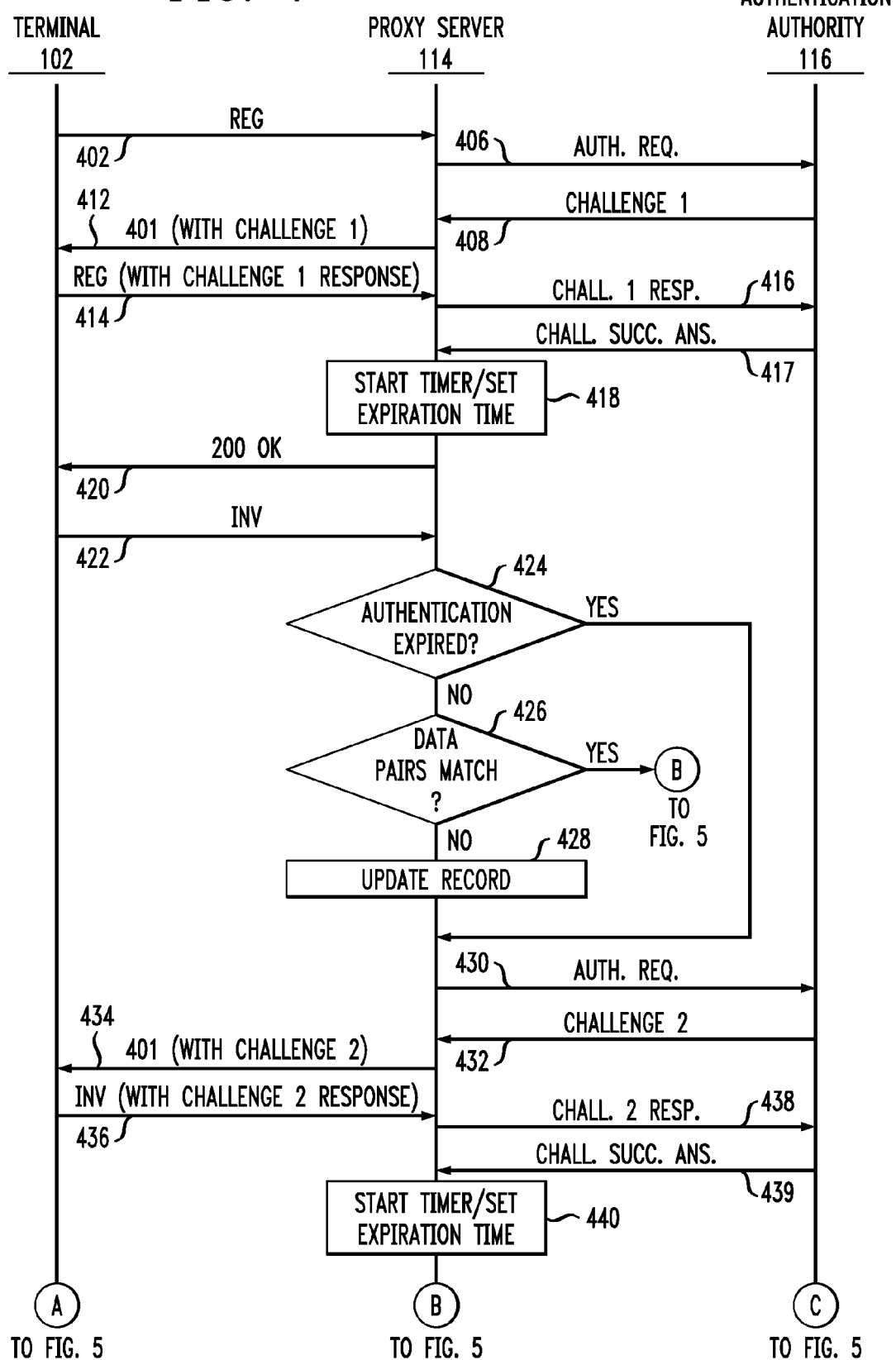
FIGS. 4 and 5 are a signaling diagram of signaling in the network of FIG. 1 according to an aspect of the invention.

Further according to this example, the user of terminal 102 registers with proxy server 114 in the conventional manner, at steps 402-417 of FIG. 4 which duplicate steps 202-217 of FIG. 2. After having authenticated the user of terminal 102, proxy server 114 starts the timer in entry 306 or enters in entry 306 a time in the future when the authentication will expire, at step 216. The amount of time measured or indicated in field 306 may be any desired amount of time, such as 24 hours, for example. Proxy server 114 then sends the 200 OK SIP message to terminal 102, at step 420, thereby completing the registration.

Figure 5:
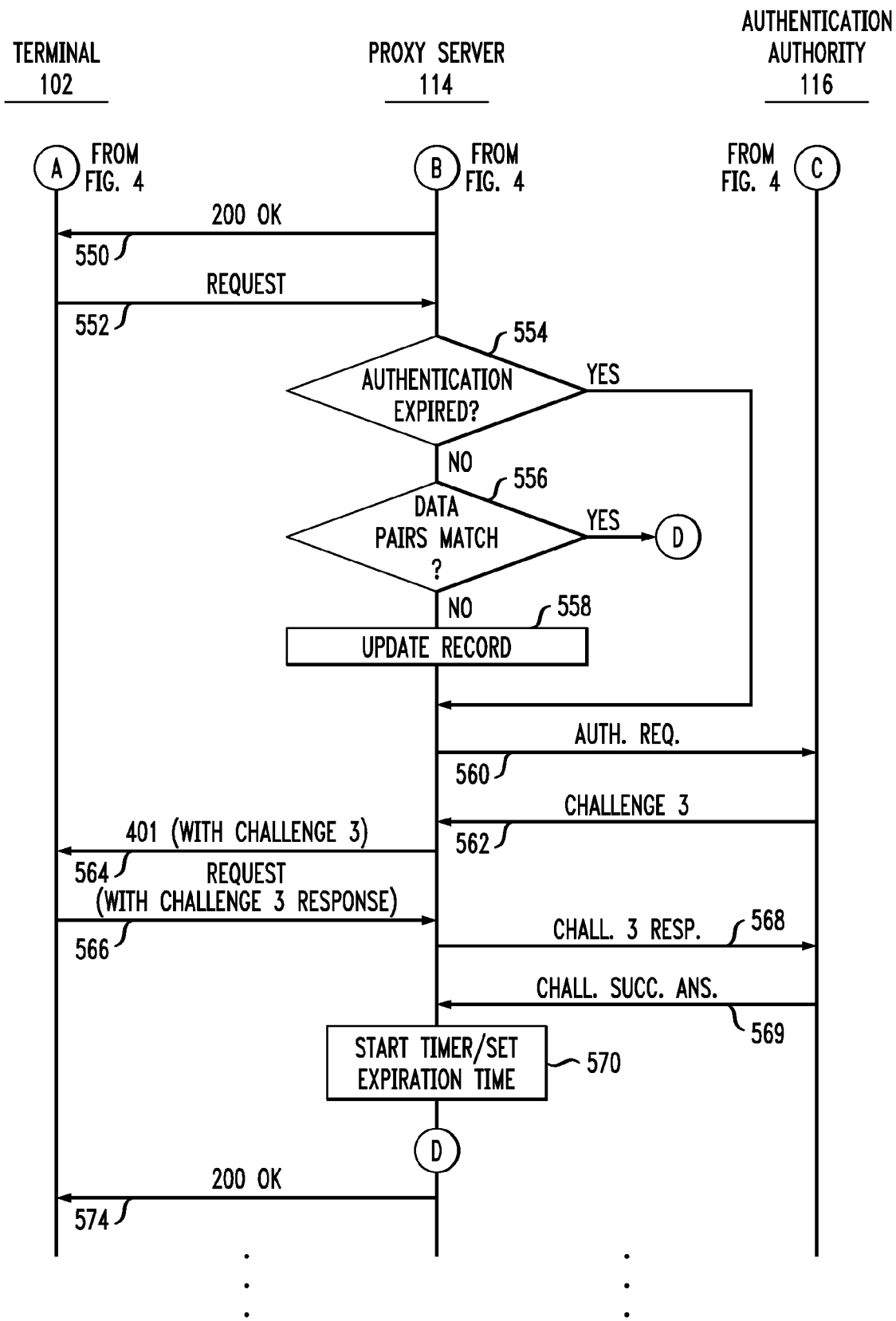

When the user of terminal 102 wishes to initiate a call, terminal 102 generates and sends an INV SIP request to proxy server 114, at step 422. In response, proxy server 114 checks whether the authentication of that client has expired, at step 424. Proxy server 114 does this by checking entry 306 of the client's record 300 to determine if either the timer has expired or the time stored in entry 306 precedes the current time. If the authentication has not expired, proxy server 114 checks the AOR and connection identifier data that it received in the INV request against the contents of the pair of entries 302 and 304 in the client's record 300 to determine if they match, at step 426. They may not match because connection 120 between terminal 102 and proxy server 114 has been taken down (e.g., failed) and has been reestablished, which would result in the connection identifier received in the request being different from the connection identifier stored in entry 304 of the client's record 300. Proxy server 114 therefore updates the client's record 300 by changing contents of entry 304 to the new connection identifier, at step 428. If the authentication has expired or the data pairs do not match, re-authentication is required, and so proxy server 114 re-authenticates the client, at steps 430-439, which replicate steps 230-239 of FIG. 2. Proxy server 114 then restarts the timer or sets a new expiration time in entry 306 of the client's record 300, at step 440. If, however, the authentication has not expired and the data pairs match, re-authentication of the client is not necessary, and so proxy server 114 skips steps 428-436. Proxy server 114 then sends a 200 OK SIP message to terminal 102, and step 550 of FIG. 5.

When terminal 102 sends another request for proxy server 114, at step 552, proxy server 114 repeats the activity of steps 424-428, at steps 554-558. If the authentication has expired or the data pairs do not match, proxy server 114 re-authenticates the client, at steps 560-569, which duplicate steps 430-439, and restarts the timer or enters a new time in entry 306 of record 300, at step 570. But if authentication has not expired and the data pairs match, proxy server 114 skips steps 558-570 and proceeds directly to sending a 200 OK SIP message to terminal 102, at step 574. And so on for each subsequent SIP request.

Alternatively to what is shown in FIG. 2, proxy server 114 may perform steps 230-232 following step 214 and send the second challenge to terminal 102 in the 200 OK message at step 220. This enables steps 222 and 234 to be skipped. Similarly, proxy server 114 may perform steps 260-262 following steps 236 and send the third challenge to terminal 102 in the 200 OK message at step 250. This enables steps 252 and 264 to be skipped. And so on. This is known as the "next nonce" construct. Although this alternative signaling scheme reduces the amount of signaling traffic between proxy server 114 and terminal 102, it has no effect on either the volume of frequency of signaling traffic between proxy server 114 and authentication authority 116.

The invention may likewise be used within this alternative context, simply by re-sending to the client the last-sent challenge with every 200 OK message.

Figure 6:
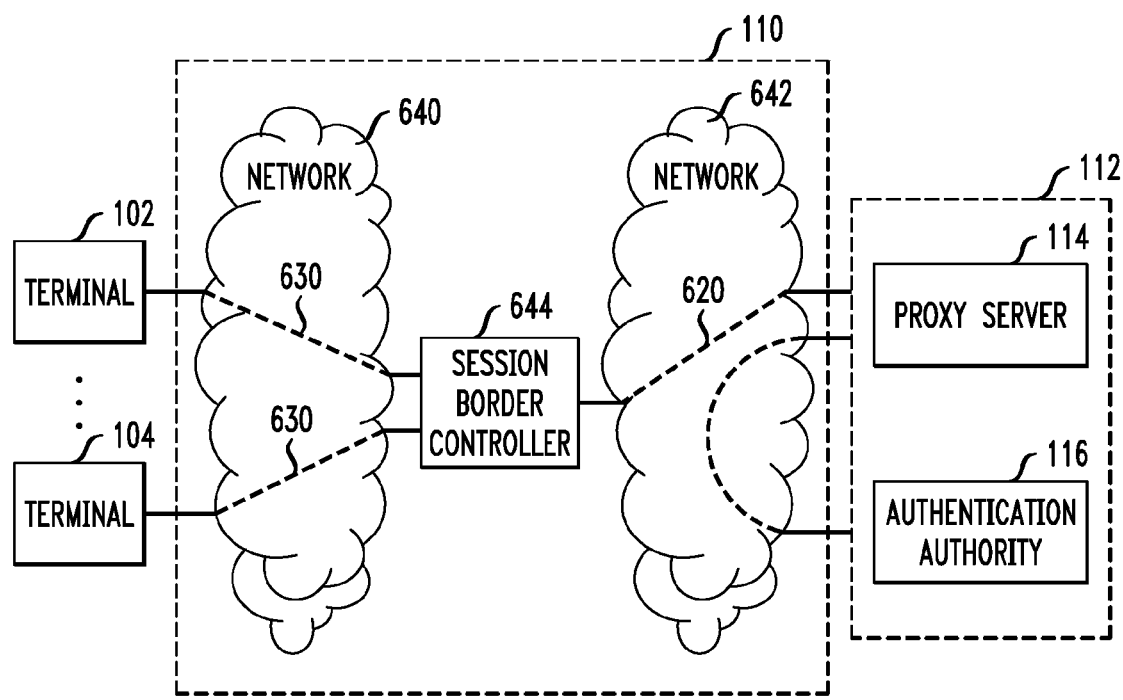
FIG. 6 is a block diagram of an alternative communications network.

FIG. 6 shows a modified form of the communications system of FIG. 1, wherein network 110 comprises at least two networks 640 and 642 that are interconnected by a gateway. In a SIP network, the gateway is a session border controller (SBC) 644, such as a border security controller (BSC). Terminals 102-104 are connected to SBC 644 via connections 630 in network 640, while SBC 644 is connected to proxy server 114 via one or more connections 620 in network 642. As a consequence, if one of the connections 630 has gone down and then been restored to a different connection on SBC 644, thus resulting in a change of the connection identifier of that connection 630, proxy server 114 is not aware of this change because the connection identifier of connection 620 has not changed. If SBC 644 connects only one terminal 102 to proxy server 114 via each connection 620, one solution to this problem is for SBC 644 to take down and then restore connection 620 whenever the corresponding connection 630 goes down and is restored. But if SBC 644 connects a plurality of terminals 102-104 to proxy server 114 via connection 620, this solution is impractical. In this scenario, a practical solution to the problem is for SBC 644 to signal proxy server 114 whenever a connection 620 is restored, and for proxy server 114 to treat this notification in the same manner as it treats, in FIGS. 4-5, a changed connection identifier of a connection 120 in FIG. 1. Any desired signaling scheme may be employed for this purpose. One way of effecting the signaling is via enhanced SIP signaling wherein a PAD transport header includes a flow-token—a parameter—that identifies a connection on SBC 644 of any connection 630 that has been taken down and been restored.

Of course, various changes and modifications to the illustrative embodiment described above will be apparent to those skilled in the art. For example, while illustratively described herein for SIP, the invention is generally applicable to any higher-level protocol that runs on top of a lower-level connection-oriented transport protocol and semantically requires authentication, such as file transfer, SSH, HTTP, application sharing, e-mail, or any other application protocol that challenges requests. These changes and modifications can be made without departing from the spirit and the scope of the invention and without diminishing its attendant advantages. It is therefore intended that such changes and modifications be covered by the following claims except insofar as limited by the prior art.

What is claimed is:

1. A method of authenticating SIP signaling comprising:
   in response to a first request of a client on a communication connection to initiate a voice call over the communication connection, authenticating the client and associating the client, in a record, with a first identifier for the connection included in the first request;
   in response to at least one second request of the client on the connection and subsequent to the first request, forbearing from authenticating the client, wherein forbearing from authenticating the client comprises determining, based on the record, whether a second identifier for the connection included in the second request matches the first identifier and forbearing from authenticating the client in response to determining that the second identifier matches the first identifier; and
   in response to a third request of the client on the connection and subsequent to the at least one second request, authenticating the client, wherein authenticating the client comprises determining, based on the record, whether a third identifier for the connection in the third request does not match the first identifier and authenticating the client in response to determining that the third identifier does not match the first identifier.

2. The method of claim 1 further comprising:
   in response to successfully authenticating the client, complying with the request; and
   in response to unsuccessfully authenticating the client, forbearing from complying with the request.

3. The method of claim 2 further comprising:
   in response to unsuccessfully authenticating the client, tearing down the connection.

4. The method of claim 1 wherein:
   the first, the at least one second, and the third request are made via a TCP/IP model application-layer protocol.

5. The method of claim 4 wherein:
   the protocol is SIP.

6. The method of claim 5 wherein:
   the first request comprises a first SIP invite, the second request comprises a second SIP invite, and the third request comprises a third SIP invite.

7. The method of claim 4 wherein the transport layer protocol is a secure protocol.

8. The method of claim 1 wherein:
   forbearing from authenticating the client further comprises
   in response to determining that the second identifier matches the first identifier, determining whether the authentication of the client has expired, and
   in response to determining that the authentication of the client has not expired, forbearing from authenticating the client; wherein
   the method further comprises
   in response to determining that the authentication of the client has expired, authenticating the client.

9. The method of claim 1 wherein:
   forbearing from authenticating the client further comprises
   in response to determining that the second identifier does not match the first identifier, authenticating the client.

10. The method of claim 1 wherein:
    forbearing from authenticating the client comprises
    in response to determining that the second identifier matches the first identifier, determining whether either (a) either an identifier of the client has changed from the first request or (b) the authentication of the client has expired, and
    in response to determining that both (a) the identifier of the client has not changed and (b) the authentication of the client has not expired, forbearing from authenticating the client; wherein the method further comprises
    in response to determining that either (a) either the identifier of the client has changed or (b) the authentication of the client has expired, authenticating the client.

11. The method of claim 1 wherein:
    the first, the at least one second, and the third request are made via a TCP/IP model application-layer protocol.

12. The method of claim 1 wherein:
    the first, the at least one second, and the third request are made via SIP.

13. The method of claim 1 wherein:
    authenticating the client comprises
    in response to an individual one of the first or the third request of the client, sending a request to an authentication authority for a challenge;
    in response to receiving a response to the challenge from the client, determining whether the response is correct;
    in response to determining that the response is correct, complying with the individual request; and
    in response to determining that the response is not correct, forbearing from complying with the individual request.

14. A method comprising:
    in response to a first SIP request of a client on a communication connection with a proxy server, authenticating the client and associating the client, in a record, with a first identifier for the connection included in the first SIP request;
    in response to at least a second SIP request of the client on the connection and subsequent to the first SIP request, forbearing from authenticating the client, wherein forbearing from authenticating the client comprises determining, based on the record, whether a second identifier for the connection included in the second SIP request matches the first identifier and forbearing from authenticating the client in response to determining that the second identifier matches the first identifier; and
    in response to at least a third SIP request of the client on the connection and subsequent to the at least one second SIP request, authenticating the client, wherein authenticating the client comprises determining, based on the record, whether a third identifier for the connection in the third SIP request does not match the first identifier and authenticating the client in response to determining that the third identifier does not match the first identifier.

15. A non-transitory computer storage medium storing computer-readable instructions which, when executed by the computer, perform the method of one of claims 1-14.

16. A server comprising:
means responsive to a first SIP invite of a client on a communication connection to initiate a voice call over the communication connection, for authenticating the client and associating the client, in a record, with a first identifier for the connection included in the first SIP invite;
means responsive to at least one second SIP invite of the client on the connection and subsequent to the first SIP invite, for forbearing from authenticating the client, wherein forbearing from authenticating the client comprises determining, based on the record, whether a second identifier for the connection included in the second SIP invite matches the first identifier and forbearing from authenticating the client in response to determining that the second identifier matches the first identifier; and
means responsive to a third SIP invite of the client on the connection and subsequent to the at least one second SIP invite, for authenticating the client, wherein authenticating the client comprises determining, based on the record, whether a third identifier for the connection in the third SIP invite does not match the first identifier and authenticating the client in response to determining that the third identifier does not match the first identifier.

17. The server of claim 16 wherein:
the server is a proxy server.

18. An apparatus comprising:
a server adapted to respond to a first SIP invite of a client on a communication connection to initiate a voice call over the communication connection by authenticating the client and associating the client, in a record, with a first identifier for the connection included in the first SIP invite, adapted to respond to at least one second SIP invite of the client on the connection and subsequent to the first SIP invite by forbearing from authenticating the client, wherein forbearing from authenticating the client comprises determining, based on the record, whether a second identifier for the connection included in the second SIP invite matches the first identifier and forbearing from authenticating the client in response to determining that the second identifier matches the first identifier, and adapted to respond to a third SIP invite of the client on the connection and subsequent to the at least one second SIP invite by authenticating the client, wherein authenticating the client comprises determining, based on the record, whether a third identifier for the connection in the third SIP invite does not match the first identifier and authenticating the client in response to determining that the third identifier does not match the first identifier; and
an authentication authority adapted to cooperate with the server to authenticate the client.

19. An apparatus for authenticating SIP signaling comprising:
a store for storing instructions; and
a processor for executing the instructions;
wherein the store and the processor together form a server adapted to respond to a first request of a client on a communication connection to initiate a voice call over the communication connection by authenticating the client and associating the client, in a record, with a first identifier for the connection included in the first request, to respond to at least one second request of the client on the connection and subsequent to the first request by forbearing from authenticating the client, wherein forbearing from authenticating the client comprises determining, based on the record, whether a second identifier for the connection included in the second request matches the first identifier and forbearing from authenticating the client in response to determining that the second identifier matches the first identifier, and to respond to a third request of the client on the connection and subsequent to the at least one second request by authenticating the client, wherein authenticating the client comprises determining, based on the record, whether a third identifier for the connection in the third request does not match the first identifier and authenticating the client in response to determining that the third identifier does not match the first identifier.

20. The apparatus of claim 19 wherein:
the server is further adapted to respond to successfully authenticating the client by complying with the request, and to respond to unsuccessfully authenticating the client by forbearing from complying with the request.

21. The apparatus of claim 20 wherein:
the server is further adapted to respond to unsuccessfully authenticating the client by tearing down the connection.

22. The apparatus of claim 19 wherein:
the server is adapted to receive the first, the at least one second, and the third request via a TCP/IP model application-layer protocol.

23. The apparatus of claim 22 wherein:
the protocol is SIP.

24. The apparatus of claim 23 wherein:
the first request comprises a first SIP invite, the second request comprises a second SIP invite, and the third request comprises a third SIP invite.

25. The apparatus of claim 22 wherein:
the transport layer protocol is a secure protocol.

26. The apparatus of claim 19 wherein:
the server is adapted to forbear from authenticating the client by (a) in response to determining that the second identifier matches the first identifier, determining whether the authentication of the client has expired, and (b) in response to determining that the authentication of the client has not expired, forbearing from authenticating the client; and wherein
the server is further adapted to respond to determining that the authentication of the client has expired, by authenticating the client.

27. The apparatus of claim 19 wherein:
the server is further adapted to respond to determining that the second identifier does not match the first identifier, by authenticating the client.

28. The apparatus of claim 19 wherein:
the server is adapted to forbear from authenticating the client by (a) in response to determining that the second identifier matches the first identifier, determining whether either (1) either an identifier of the client has changed from the first request or (2) the authentication of the client has expired, and (b) in response to determining that both (1) the identifier of the client has not changed and (2) the authentication of the client has not expired, by forbearing from authenticating the client; and wherein the server is further adapted to respond to determining that either (1) either the identifier of the client has changed or (2) the authentication of the client has expired, by authenticating the client.

29. The apparatus of claim 19 wherein:

the server is adapted to receive the first, the at least one second, and the third request via a TCP/IP model application-layer protocol.

30. The apparatus of claim 19 wherein:

the server is adapted to receive the first, the at least one second, and the third request via SIP.

31. The apparatus of claim 19 wherein:

the server is adapted to authenticate the client by (a) in response to an individual one of the first or the third request of the client, sending a request to an authentication authority for a challenge, (b) in response to receiving a response to the challenge from the client, forwarding the response to the authentication authority for determining whether the response is correct; (c) and wherein the server is further adapted to respond to a determination that the response is correct by complying with the individual request, and to respond to a determination that the response is not correct by forbearing from complying with the individual request.

32. The apparatus of claim 19 wherein:

the server comprises a proxy server;

the first request is a first SIP request of a client on a communication connection with a proxy server;

the at least one second request is at least one second SIP request of the client on the connection and subsequent to the first SIP request; and the third request is a third SIP request of the client on the connection and subsequent to the at least one second SIP request.

* * * * *